United States Patent
Diab et al.

(10) Patent No.: US 8,661,282 B2
(45) Date of Patent: *Feb. 25, 2014

(54) SYSTEM AND METHOD FOR ENERGY SAVINGS ON A PHY/MAC INTERFACE FOR ENERGY EFFICIENT ETHERNET

(75) Inventors: Wael William Diab, San Francisco, CA (US); Scott Powell, Carlsbad, CA (US); Howard Baumer, Laguna Hills, CA (US)

(73) Assignee: Broadcom Corporation, Irvine, CA (US)

( * ) Notice: Subject to any disclaimer, the term of this patent is extended or adjusted under 35 U.S.C. 154(b) by 151 days.

This patent is subject to a terminal disclaimer.

(21) Appl. No.: 13/355,519

(22) Filed: Jan. 21, 2012

(65) Prior Publication Data

US 2012/0124405 A1    May 17, 2012

Related U.S. Application Data

(63) Continuation of application No. 12/362,763, filed on Jan. 30, 2009, now Pat. No. 8,127,164.

(60) Provisional application No. 61/028,179, filed on Feb. 12, 2008.

(51) Int. Cl.
  *G06F 1/32* (2006.01)
  *G06F 15/177* (2006.01)
  *G06F 1/28* (2006.01)

(52) U.S. Cl.
  USPC ............ 713/324; 713/320; 713/323; 709/221

(58) Field of Classification Search
  USPC ........................................................ 713/324
  See application file for complete search history.

(56) References Cited

U.S. PATENT DOCUMENTS

| | | |
|---|---|---|
| 6,366,557 B1 | 4/2002 | Hunter |
| 6,442,174 B1 | 8/2002 | Lin |
| 7,417,949 B2 | 8/2008 | Weller et al. |
| 7,574,615 B2 | 8/2009 | Weng et al. |
| 7,720,068 B2 | 5/2010 | McClellan |
| 7,930,373 B2 | 4/2011 | Diab |
| 2003/0191854 A1 | 10/2003 | Hsu et al. |
| 2003/0226050 A1 | 12/2003 | Yik et al. |
| 2005/0188232 A1 | 8/2005 | Weng et al. |
| 2006/0153238 A1 | 7/2006 | Bar-On et al. |
| 2007/0049239 A1 | 3/2007 | Joung et al. |
| 2007/0127581 A1 | 6/2007 | Connor et al. |
| 2007/0142098 A1 | 6/2007 | Behzad et al. |
| 2007/0280239 A1 | 12/2007 | Lund |
| 2008/0049788 A1 | 2/2008 | McClellan |
| 2008/0170586 A1 | 7/2008 | Huff et al. |
| 2008/0225841 A1 | 9/2008 | Conway et al. |
| 2008/0225879 A1 | 9/2008 | Powell |
| 2008/0232290 A1 | 9/2008 | Eizur et al. |
| 2009/0097401 A1 | 4/2009 | Diab |
| 2009/0154492 A1 | 7/2009 | Diab et al. |
| 2009/0187778 A1 | 7/2009 | Diab et al. |
| 2009/0193109 A1 | 7/2009 | Kuo et al. |
| 2009/0225773 A1 | 9/2009 | Winter |
| 2009/0263127 A1 | 10/2009 | Haran et al. |
| 2009/0327506 A1 | 12/2009 | Diab |
| 2010/0118753 A1 | 5/2010 | Mandin et al. |

*Primary Examiner* — Ryan Stiglic
(74) *Attorney, Agent, or Firm* — Duane S. Kobayashi

(57) ABSTRACT

A system and method for energy savings on a PHY/MAC interface for energy efficient Ethernet. Power savings for a PHY due to low-link utilization can also be realized in the higher layer elements that interface with the PHY. In one embodiment, subrating is implemented on a MAC/PHY interface to match a subrating of the PHY with a remote link partner. This subrating is less than the full capacity rate and can be zero.

23 Claims, 5 Drawing Sheets

SYSTEM AND METHOD FOR ENERGY SAVINGS ON A PHY/MAC INTERFACE FOR ENERGY EFFICIENT ETHERNET

This application is a continuation of non-provisional patent application Ser. No. 12/362,763, filed Jan. 30, 2009, which claims priority to provisional application No. 61/028,179, filed Feb. 12, 2008. Each of the above-identified patents and/or applications is incorporated by reference herein, in its entirety, for all purposes.

BACKGROUND

1. Field of the Invention

The present invention relates generally to Ethernet systems and, more particularly, to a system and method for energy savings on a physical layer device (PHY)/media access control (MAC) interface for energy efficient Ethernet.

2. Introduction

Energy costs continue to escalate in a trend that has accelerated in recent years. Such being the case, various industries have become increasingly sensitive to the impact of those rising costs. One area that has drawn increasing scrutiny is the IT infrastructure. Many companies are now looking at their IT systems' power usage to determine whether the energy costs can be reduced. For this reason, an industry focus on energy efficient networks has arisen to address the rising costs of IT equipment usage as a whole (i.e., PCs, displays, printers, servers, network equipment, etc.).

In designing an energy efficient solution, one of the considerations is the traffic profile on the network link. For example, many network links are typically in an idle state between sporadic bursts of data, while in other network links, there can be regular or intermittent low-bandwidth traffic, with bursts of high-bandwidth traffic. An additional consideration for an energy efficient solution is the extent to which the traffic is sensitive to buffering and latency. For example, some traffic patterns (e.g., HPC cluster or high-end 24-hr data center) are very sensitive to latency such that buffering would be problematic. For these and other reasons, applying energy efficient concepts to different traffic profiles would lead to different solutions. These varied solutions can therefore seek to adapt the link, link rate, and layers above the link to an optimal solution based on various energy costs and impact on traffic, which itself is dependent on the application.

One example of an EEE solution is a low power idle (LPI) mode. In general, LPI relies on turning the active channel silent when there is nothing to transmit. When data is transmitted, it is transmitted at full PHY capacity. Energy is thereby saved when the link is off. Another example of an EEE solution is a subrating technique where the link rate is reduced when the high data capacity is not needed. In the physical layer, this subrating technique is enabled by the use of a subset of the parent PHY. While these various EEE solutions can provide significant energy savings, what is needed is a mechanism for saving energy in all interfaces of the PHY.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

SUMMARY

A system and method for energy savings on a PHY/MAC interface for energy efficient Ethernet, substantially as shown in and/or described in connection with at least one of the figures, as set forth more completely in the claims.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Ethernet has become an increasingly pervasive technology that has been applied in various contexts such as twisted pair and backplane. IEEE 802.3az Energy Efficient Ethernet (EEE) continues to evaluate various methods for reducing energy used by reducing link rates during periods of low link utilization. In this process, a protocol would be defined that would facilitate transitions to and from lower power consumption modes in response to changes in network demand.

In general, a reduction in link rate to a sub-rate of the main rate enables a reduction in power, thereby leading to energy savings. In one example, this sub-rate can be a zero rate, which produces maximum power savings. In one example, a subset PHY technique can be used to reduce the link rate to a sub-rate. In this subset PHY technique, a low link utilization period can be accommodated by transitioning the PHY to a lower link rate that is enabled by a subset of the parent PHY. In one embodiment, the subset PHY technique is enabled by turning off portions of the parent PHY to enable operation at a lower or subset rate. For example, a subset 1 G PHY can be created from a parent 10 GBASE-T PHY by a process that turns off three of the four channels. In another embodiment, the subset PHY technique is enabled by slowing down the clock rate of a parent PHY. For example, a parent PHY having an enhanced core that can be slowed down and sped up by a frequency multiple can be slowed down by a factor of 10 during low link utilization, then sped up by a factor of 10 when a burst of data is received. In this example of a factor of 10, a 10 G enhanced core can be transitioned down to a 1 G link rate when idle, and sped back up to a 10 G link rate when data is to be transmitted. In another example of subrating, a protocol such as low power idle (LPI) can be used to create a sub-rate of zero. In general, LPI relies on turning the active channel silent when there is nothing to transmit. Energy is thereby saved when the link is off.

Figure 1:
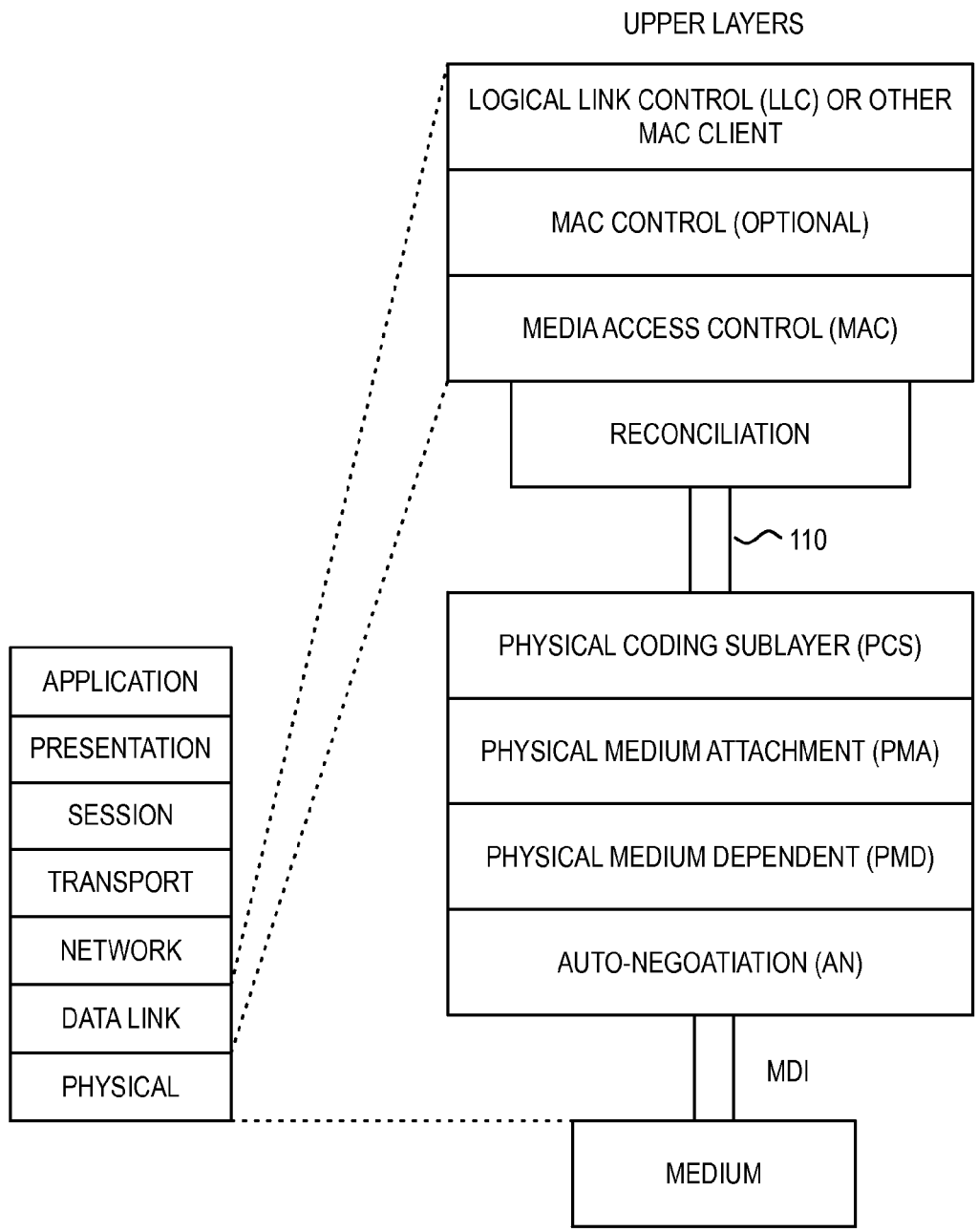
FIG. 1 illustrates the ISO Open System Interconnection (OSI) reference model and its mapping to the IEEE 802.3 layering.

As these examples illustrate, power savings can be realized through the implementation of subrating by the PHY during periods of low link utilization. It is a feature of the present invention that power savings can also be realized beyond the PHY itself during periods of low link utilization. To illustrate the principles of the present invention, reference is first made to FIG. 1, which illustrates the ISO Open System Interconnection (OSI) reference model and its mapping to the IEEE 802.3 layering.

As illustrated, the physical layer (often referred to as the PHY) includes a physical coding sublayer (PCS), a physical medium attachment (PMA), physical media dependent (PMD), and auto-negotiation (AN). It should be noted that some of these layers (e.g., auto-negotiation) are optional for some PHY types, and that some PHY types do no use all of the sub-layers. As illustrated, the PCS is coupled to a reconciliation sublayer (RS), which provides a signal mapping between interface 110 and the MAC layer. In various examples, interface 110 can be based on an Attachment Unit Interface (AUI), media independent interface (MII), serial MII (SMII), reduced MII, (RMII), gigabit MII (GMII), reduced GMII (RGMII), serial GMII (SGMII), quad serial gigabit MII (QSGMII), 10 gigabit MII (XGMII), SXGMII, XFI, 10-Gbps AUI (XAUI), or the like. In an MII example, the PCS is generally responsible for encoding/decoding to/from five-bit code-groups (4B/5B) for communication with the underlying PMA. In a GMII example, the PCS is generally responsible for encoding/decoding GMII octets to/from ten-bit code-groups (8B/10B) for communication with the underlying PMA. In an XGMII example, the PCS is generally responsible for encoding/decoding XGMII 64-bit data to/from 66-bit code-groups (64B/66B) for communication with the underlying PMA. In various embodiments, one or more parts of the PHY can be internal or external to the MAC. In one embodiment, an extender such as the XAUI extender sublayer (XGXS) or XFI can be used between the MAC/PHY.

In general, the PMA abstracts the PCS from the physical medium. Accordingly, the PCS can be unaware of the type of medium. The primary functions of the PMA include mapping of transmit and receive code-groups between the PCS and PMA, serialization/de-serialization of code-groups for transmission/reception on the underlying PMD, recovery of clock from the coded data (e.g., 4B/5B, 8B/10B, 64B/66B, etc.) supplied by the PMD, and mapping of transmit and receive bits between the PMA and PMD.

The PMD is generally responsible for generating electrical or optical signals depending on the nature of the physical medium connected. PMD signals are sent to the medium dependent interface (MDI), which is the actual medium connected, including connectors, for the various media supported.

As noted, one of the ways of creating an energy efficient network is through efficient link utilization. In general, the lack of data transmission does not significantly reduce energy consumption of a PHY in most implementations. A 10 Gbit/s link, for example, will consume about the same amount of power whether a burst of data is transmitted during a file transfer, a constant stream of data is transmitted at lower bandwidth, or no data is transmitted during an idle period. If subrating is used on a 10 Gbit/s link during idle times, then power can be saved in the operation of the PHY.

In accordance with the present invention, it is recognized that if subrating is used in the PHY, then power savings can also be realized in the higher layer elements (e.g., MAC layer) that interface with the PHY. In other words, a change in the PHY to produce energy savings can trigger a change upstream to produce additional energy savings. In one embodiment, an entry by the PHY into a lower-power consumption mode (e.g., LPI or subset PHY mode) can enable the PHY's MAC interface to similarly enter into a lower-power consumption mode. Power savings can then be realized on the MAC side and PHY side of the interface, as well as in the interface itself.

Figure 2:
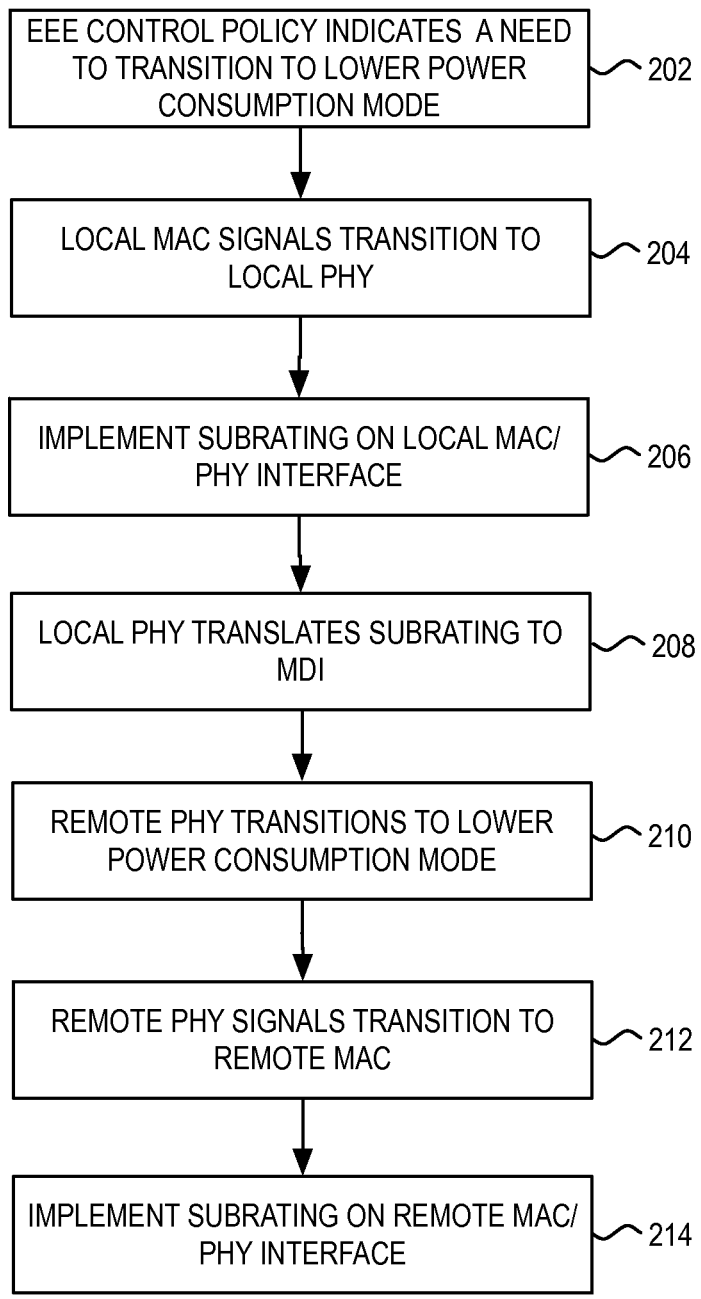
FIG. 2 illustrates a flowchart of a process of the present invention.

To illustrate the principles of the present invention, reference is now made to the flowchart of FIG. 2, which illustrates an EEE process between two link partners. As illustrated, the process begins at step 202 where an EEE control policy indicates the need to transition to a lower power consumption mode. As would be appreciated, the EEE control policy can be based on an analysis of various link-related parameters. In the present example, the EEE control policy is implemented in a layer above the PHY (e.g., MAC), although in an alternative embodiment, the EEE control policy is implemented in the PHY itself to enable legacy support. As would be appreciated, the particular location of the EEE control policy would be implementation dependent.

At step 204, the needed transition to a lower power consumption mode is signaled by the local MAC to the local PHY. For example, in the subrating case of LPI, the MAC can assert LPI (rather than regular idle) on the local MAC/PHY interface (e.g., xxMII). After such signaling, the subrating can be applied to the local MAC/PHY interface at step 206. For example, once the LPI command has been given, there is no need for the TX part of the MAC/PHY interface to stay on and both the MAC side as well as the PHY side can save power by implementing a zero subrating. Here, the PHY side of the TX on the local partner can switch everything off in its circuitry that faces that portion of the MAC. To get out of this state, the MAC can assert a signal (for example a clock in the xxMII implementation) and the PHY can keep some form of energy detector alive.

Figure 3:
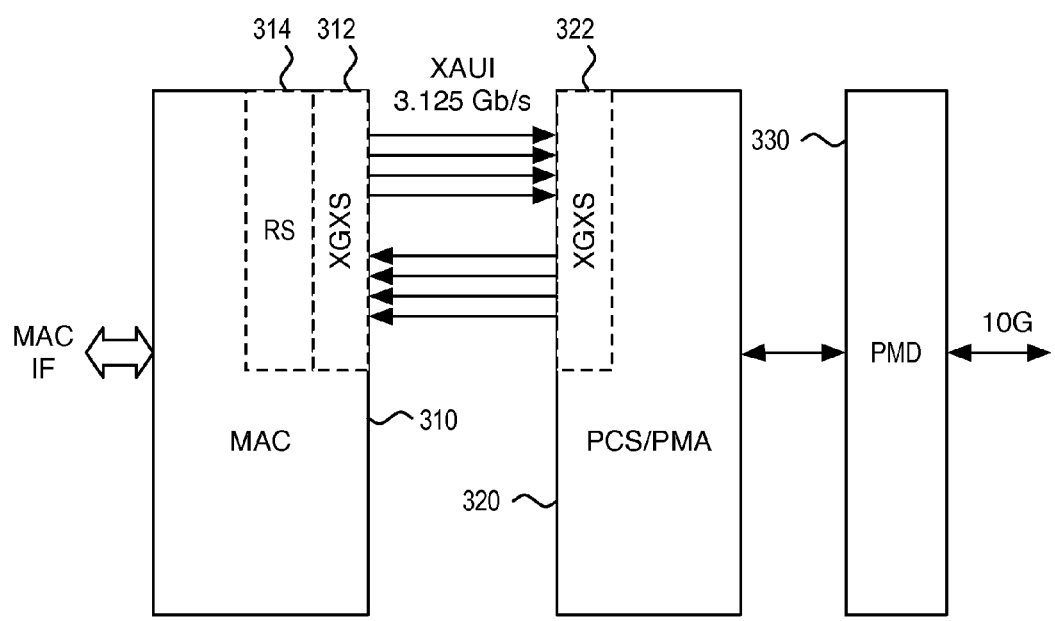
FIG. 3 illustrates an example interface between a MAC and a PHY.

FIG. 3 illustrates an example of a MAC/PHY interface that can implement subrating. In various embodiments, PCS/PMA 320 and PMD 330 can be implemented separately or as a single chip. As illustrated, the interface between MAC 310 and PCS/PMA 320 of the PHY is facilitated by XAUI extender sublayer (XGXS) 212, 222, which further facilitates four 3.125 Gb/s transmit/receive channels using 8B/10B encoding. In general, XAUI is a low pin count, self-clocked serial bus that is designed as an interface extender for XGMII. Here, XAUI provides a mapping between XGMII and serial. The four XAUI channels map to the MDI. XAUI may be used in place of (or to extend) XGMII in various chip-to-chip applications due to reduced pin count and much longer allowed trace lengths. In one application such as backplane Ethernet IEEE 802.3ap, 10-Gbit operation can be enabled using the 10 GBASE-KX4 implementation, which specifies four channels (similar to XAUI).

Figure 4:
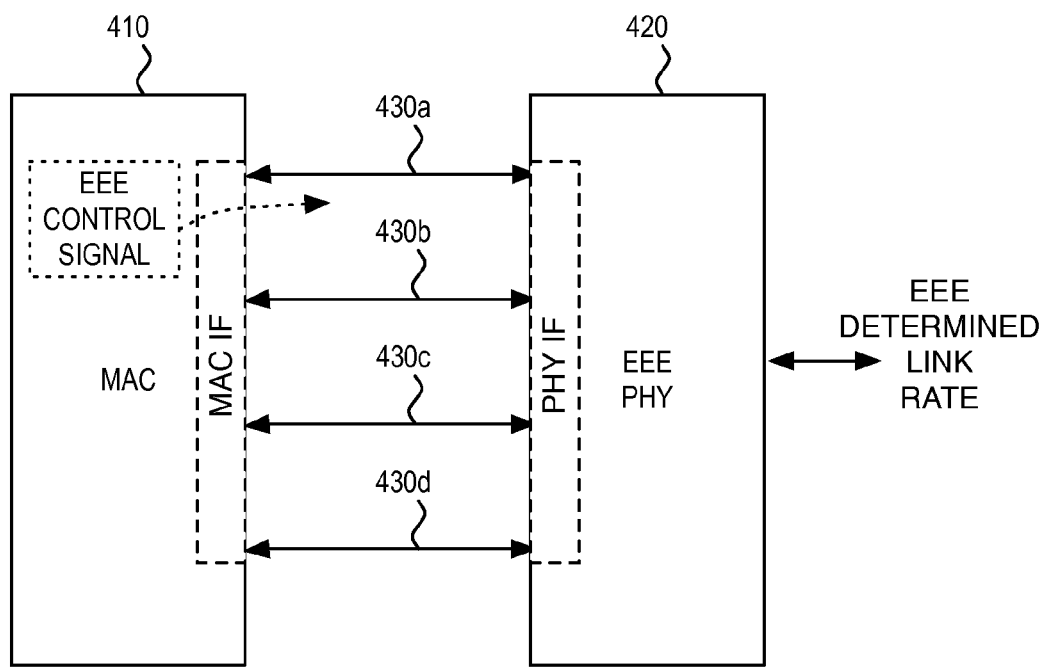
FIGS. 4 and 5 illustrates another view of an example interface between a MAC and a PHY.

FIG. 4 illustrates another view of the MAC/PHY interface for the example of a 10 G link of FIG. 3. As illustrated, the interface between MAC 410 and PHY 420 is supported by four separate channels 430a-430d. Each of these four separate channels 430a-430d would be active in operation at a 10 G link rate.

As FIG. 4 further illustrates, an EEE control signal from a controller is transmitted from the MAC to the PHY to indicate the transition to a lower power consumption mode. In one embodiment, the implementation of subrating of the MAC/PHY interface in response to the transition to the lower power consumption mode can be effected through the transition of one or more channels of the MAC/PHY interface into an inactive state. For example, a lower power consumption mode of the MAC/PHY interface can be effected by having a single channel 430a active, while the remaining channels 430b, 430c, 430d are all placed in an inactive state. In one embodiment, the channels that are shut down can use a low duty cycle signal that consumes minimal power to ensure that synchronization is not lost.

In the above example, subrating is effected through shutting down one or more of the channels in the MAC/PHY interface. If a single channel is used in the MAC/PHY interface, then the interface of the single channel can be slowed down. In yet another scenario, one or more channels in a multiple channel MAC/PHY interface can be slowed down. In general, the MAC/PHY interface can be configured for operation at a rate indicated by the control signal. In various embodiments, this configuration can include the subrating of one or more channels on the MAC/PHY interface, thereby yielding a variable MAC/PHY interface.

Referring again to the flowchart of FIG. 2, the request to transition to a lower power consumption is also translated by the local PHY to the physical domain on the MDI at step 208. In general, the new link rate of the PHY on the MDI can be matched to the slower equivalent rate in the local MAC/PHY interface. Here, the subrating of the link rate between the local and remote link partners can be implemented by various PHY techniques such as LPI, subset PHY, etc.

Next, at step 210, the PHY on the remote side receives the physical signaling on its RX on the MDI and initiates going into the lower energy consumption mode. As would be appreciated, the particular protocol used would be implementation dependent. On the remote end of the link, at step 212, the remote PHY would then inform the remote MAC that it has received a request for lower energy in the RX direction. In a similar manner to the local MAC/PHY (See FIG. 5), an EEE control signal can be transmitted from remote PHY 510 to remote MAC 520 across the remote MAC/PHY interface that can comprise one or more channels 530a-530d.

Finally, at step 214, after such signaling, subrating can be applied to the remote MAC/PHY interface. Again, subrating can be effected through shutting down one or more of channels 530a-530d in the MAC/PHY interface. If a single channel is used in the MAC/PHY interface, then the interface of the single channel can be slowed down. In yet another scenario, one or more channels 530a-530d in the MAC/PHY interface can be slowed down.

As described in the above example, power savings can be realized through the implementation of subrating on an asymmetric link where the entire direction of transmission between two link partners would transition into a lower power consumption mode. Depending on the specific protocol employed, the remote side of the link can either follow the lead of the local side or can block going into the lower power state. In one embodiment, a symmetric application of subrating can be used in a given link between two link partners. As would be appreciated, the specific amount of subrating used during a low power consumption mode would be implementation dependent.

Figure 5:
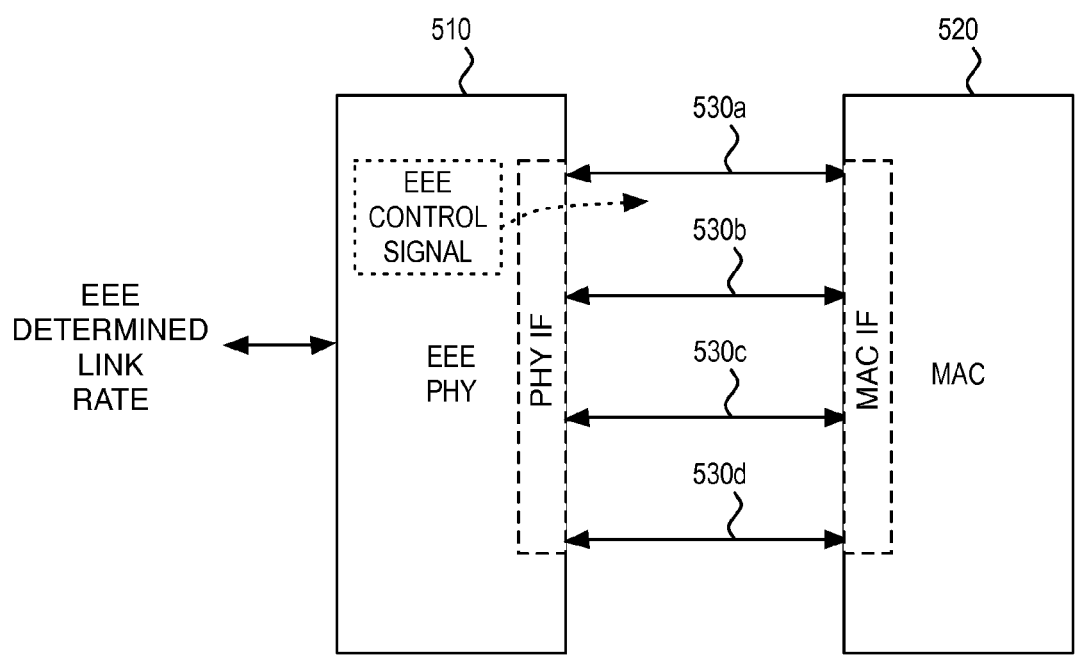

In FIGS. 4 and 5, the communication of the EEE control signal by a controller is illustrated as occurring generally across the MAC/PHY interface. This generic illustration is due to the various implementations of the MAC/PHY interface as well as the form of communication. For example, the EEE control signal could be applied to MAC/PHY interfaces that are internal or external. Moreover, the EEE control signal could be enabled using in-band signaling, out-of-band signaling, register-based communication, etc. As would be appreciated, the specific form of communication in relation to the MAC/PHY interface would be implementation dependent.

As described, it is a feature of the present invention that a transition in power consumption mode in the PHY can also produce a transition in the power consumption mode of the MAC/PHY interface. This feature of the present invention can be applied to various forms of the internal or external MAC/PHY interface, and is not confined to a conventional xxMII-type interface. For example, an external MAC/PHY interface can include one or more extenders that are facilitated by stub chips and suitable buffering. In this example, the subrating (e.g., LPI, subset PHY, or other power-savings techniques in the PHY) can be applied to the multiple extenders as well as supporting circuitry.

As would be appreciated, the principles of the present invention can be applied to various PHY types (e.g., backplane, twisted pair, optical, etc.), standard (e.g., 1 G, 10 G, etc.), non-standard (e.g., 2.5 G, 5 G, etc.), or future link rates (e.g., 40 G, 100 G, etc.), as well as different port types and media types. Further, the principles of the present invention can also be applied to the pairing of EEE PHYs with legacy MACs in implementing subrating on a MAC/PHY interface using legacy support techniques.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. A system for communication, the system comprising:
one or more circuits for use in a communication device, said one or more circuits comprising a physical layer device that is coupled to a media access control device, and said one or more circuits being operable to:
transition said physical layer device from an active power mode to a low power mode; and
subrate an interface between said physical layer device and said media access control device, said subrated interface having one or more channels in said interface turned off to reduce power consumed by said interface.

2. The system of claim 1, wherein said interface includes a plurality of channels.

3. The system of claim 1, wherein said subrated interface is in a low power idle mode.

4. The system of claim 1, wherein said subrated interface is in a subset physical layer device mode.

5. The system of claim 1, wherein said subrated interface is facilitated by a XAUI extender sublayer.

6. The system of claim 1, wherein said one or more circuits are further operable to transmit a control signal between said physical layer device and said media access control device to facilitate said subrated interface using in-band signaling.

7. The system of claim 1, wherein said one or more circuits are further operable to transmit a control signal between said physical layer device and said media access control device to facilitate said subrated interface using out-of-band signaling.

8. The system of claim 1, wherein said one or more circuits are further operable to transmit a control signal between said physical layer device and said media access control device to facilitate said subrated interface using register-based communication.

9. The system of claim 2, wherein less than all of said plurality of channels in said interface are turned off.

10. A physical layer device, comprising:
an interface for communication with a media access control device; and
a control module that controls transitions of said physical layer device from an active power mode to a low power mode, said control module being configured to transmit a control signal to said media access control device to facilitate subrating of said interface, said subrated interface having one or more channels in said interface turned off to reduce power consumed by said interface when said physical layer device has transitioned to said low power mode.

11. The device of claim 10, wherein said interface includes a plurality of channels.

12. The device of claim 10, wherein said subrated interface is in a low power idle mode.

13. The device of claim 10, wherein said subrated interface is in a subset physical layer device mode.

14. The device of claim 10, wherein said subrated interface is facilitated by a XAUI extender sublayer.

15. The device of claim 10, wherein said control module transmits a control signal to said media access control device to facilitate said subrated interface using in-band signaling.

16. The device of claim 10, wherein said control module transmits a control signal to said media access control device to facilitate said subrated interface using out-of-band signaling.

17. The device of claim 10, wherein said control module transmits a control signal to said media access control device to facilitate said subrated interface using register-based communication.

18. The device claim 11, wherein less than all of said plurality of channels in said interface are turned off.

19. An energy efficiency method in a physical layer device, comprising:
detecting a need for transitioning of said physical layer device between different power consumption modes; and
in association with said transitioning of said physical layer device, subrating an interface between said physical layer device and said media access control device, said subrated interface having one or more channels in said interface turned off to reduce power consumed by said interface.

20. The method of claim 19, wherein said interface includes a plurality of channels.

21. The method of claim 19, wherein said subrated interface is in a low power idle mode.

22. The method of claim 19, wherein said subrated interface is in a subset physical layer device mode.

23. The method of claim 20, wherein less than all of said plurality of channels in said interface are turned off.

* * * * *